(12) United States Patent
Benayoun et al.

(10) Patent No.: US 7,228,430 B2
(45) Date of Patent: Jun. 5, 2007

(54) SECURITY SYSTEM FOR PREVENTING A PERSONAL COMPUTER FROM BEING USED BY AN UNAUTHORIZED PEOPLE

(75) Inventors: Alain Benayoun, Cagnes-sur-Mer (FR); Jacques Fieschi, Biot (FR); Jean-Francois Le Pennec, Nice (FR); Pascal Roy, Biot (FR)

(73) Assignee: Lenovo Singapore Pte. Ltd, Singapore (SG)

( * ) Notice: Subject to any disclaimer, the term of this patent is extended or adjusted under 35 U.S.C. 154(b) by 664 days.

(21) Appl. No.: 10/250,722

(22) PCT Filed: Jan. 11, 2002

(86) PCT No.: PCT/EP02/00216

§ 371 (c)(1),
(2), (4) Date: Oct. 30, 2003

(87) PCT Pub. No.: WO02/056155

PCT Pub. Date: Jul. 18, 2002

(65) Prior Publication Data

US 2004/0059919 A1    Mar. 25, 2004

(30) Foreign Application Priority Data

Jan. 11, 2001   (EP)   ................... 01480003

(51) Int. Cl.
| | |
|---|---|
| *H04K 1/00* | (2006.01) |
| *H04L 9/00* | (2006.01) |
| *H04L 9/30* | (2006.01) |
| *G06F 7/04* | (2006.01) |
| *G06F 17/30* | (2006.01) |
| *G06K 9/00* | (2006.01) |
| *H03M 1/68* | (2006.01) |

(52) U.S. Cl. .................. 713/182; 713/183; 713/184; 713/185; 713/168; 713/169; 713/170; 713/171; 713/172; 726/27; 726/28; 726/29; 726/30; 726/3; 726/4; 726/5; 726/6; 380/30; 380/231; 380/232

(58) Field of Classification Search .................. None
See application file for complete search history.

(56) References Cited

U.S. PATENT DOCUMENTS 5,406,261 A    4/1995   Glenn ................. 240/571

(Continued)

FOREIGN PATENT DOCUMENTS

DE    29719395 U1 *   2/1998

(Continued)

*Primary Examiner*—Ayaz Sheikh
*Assistant Examiner*—Longbit Chai
(74) *Attorney, Agent, or Firm*—Kunzler & McKenzie; Carlos Munoz-Bustamante

(57) ABSTRACT

A security system for preventing unauthorized use of a computer device. An extractable security piece includes an extractable main private key and a main PC public key. A PC security area which is a non-extractable part of the computer device includes a PC private key and an extractable main public key, which, together with the keys of the extractable security piece, constitute a Public Key Infrastructure. The extractable security piece and the PC security area include processing means for mutual authentication of the extractable security piece and the PC security area after the extractable security piece, which had been previously removed, has been reinserted in the computer device, thereby enabling the authorized user to access data stored in the computer device.

7 Claims, 4 Drawing Sheets

U.S. PATENT DOCUMENTS

| | | | | |
|---|---|---|---|---|
| 5,566,226 A | * | 10/1996 | Mizoguchi et al. | 455/558 |
| 6,779,115 B1 | * | 8/2004 | Naim | 713/192 |
| 2001/0005682 A1 | * | 6/2001 | Terao et al. | 455/550 |

FOREIGN PATENT DOCUMENTS

| | | |
|---|---|---|
| JP | 06-149404 | 5/1994 |
| JP | 2000-57305 | 2/2000 |
| JP | 2000-172412 | 6/2000 |
| JP | 2002-539656 | 11/2002 |
| KR | PUPA 97-12154 | 3/2003 |
| WO | WO 01/01362 | 1/2001 |

* cited by examiner

SECURITY SYSTEM FOR PREVENTING A PERSONAL COMPUTER FROM BEING USED BY AN UNAUTHORIZED PEOPLE

FIELD OF THE INVENTION

The present invention relates to a system and method for preventing computer devices from being stolen or hacked, and relates more particularly to a security system for preventing unauthorized use of a personal computer.

BACKGROUND

Because computer devices such as personal computers, portable computers, and other handheld devices are targets for hackers and thieves, passwords are used to protect their vital data and to prevent the computer from being used by unauthorized people. Passwords often work in conjunction with encryption and authentication keys that are used to establish secure communications between computers. It is possible today to install a program in the computer that will encrypt sensitive data so that these data cannot be read by anyone who does not have the unlocking key. It is necessary, however, to store the key somewhere, and there is a constant risk that it will be found.

Despite the continuing development of new technologies, passwords are still the most common security tools; they are also the most abused, and often the easiest for an attacker to break. Passwords present a kind of security paradox. The best passwords are the most difficult to guess: long and random. Unfortunately, these are also the most difficult to remember. Moreover, most experts strongly recommend using different passwords for each e-mail, e-commerce, or other account, and changing the passwords regularly. As a result, most people either choose passwords that are easily guessed, or write them down where they can be copied or stolen.

One answer to this conundrum is to use password safes. These programs provide a space to store long, complex, random passwords, and then encrypt the passwords so that they cannot be stolen. Some password safes generate random passwords for the user and store these on a local disk that also has a password access protection.

Secure transmission may be provided by using Public Key Infrastructure (PKI) cryptography. In PKI cryptography, a user has a pair of keys: public and private. As their names suggest, the private key is kept private, while the public key is distributed to other users. The owner of the private key never shares the private key with anyone. The public and private keys of a particular user are related via complex mathematical structures that inexorably link one key with the other. This relationship is crucial to making public/private key-based encryption work.

The public key is used as the basis for encrypting a message, while the private key is necessary for the recipient to decrypt the encrypted message. Only the bearer of the private key can decrypt the message. Even the person who did the encrypting cannot decrypt the message he just encrypted, because he does not know the private key.

For digital signatures, two different keys are generally used, one for creating a digital signature or transforming data into a seemingly unintelligible form, and another key for verifying a digital signature or returning the message to its original form. Computer equipment and software using two such keys is often termed an "asymmetric cryptosystem."

The keys of an asymmetric cryptosystem for digital signatures are termed the private key, which is known only by the signer and which is used to create the digital signature, and the public key, which is ordinarily more widely known and which is used to verify the digital signature. A recipient must have the corresponding public key in order to verify that a digital signature is the signer's. When many people need to verify the signer's digital signature, the public key must be widely distributed, perhaps by publication in an on-line repository or directory.

Although the keys of the pair are mathematically related, it is computationally infeasible to derive one key from the other, if the asymmetric cryptosystem has been designed and implemented properly. Consequently, although many people may know the public key of a given signer and use it to verify his or her digital signature, they cannot discover the signer's private key and use it to forge the digital signature.

SUMMARY

Accordingly, an object of the invention is to provide a security system based upon the Public Key Infrastructure (PKI) preventing unauthorized use of a computer device.

A security system according to the invention includes an extractable security piece, which is a piece of the main computer device that can be removed by the authorized user. The extractable security piece includes at least an extractable main private key and a main PC public key. A PC security area, which is a non-extractable part of the computer device, contains at least a PC private key and an extractable main public key. The PC private key and the extractable main public key work together according to a Public Key Infrastructure (PKI). Processing means in both the extractable security piece and the PC security area carry out a mutual authentication of the extractable security piece and the PC security area after the extractable security piece, which had been previously removed, has been reinserted, thereby enabling the authorized user to access data stored in the computer device.

BRIEF DESCRIPTION OF THE DRAWINGS

The above and other objects, features, and advantages of the invention will be better understood by reading the following more particular description of the invention in conjunction with the accompanying drawings wherein.

DETAILED DESCRIPTION

Figure 1:
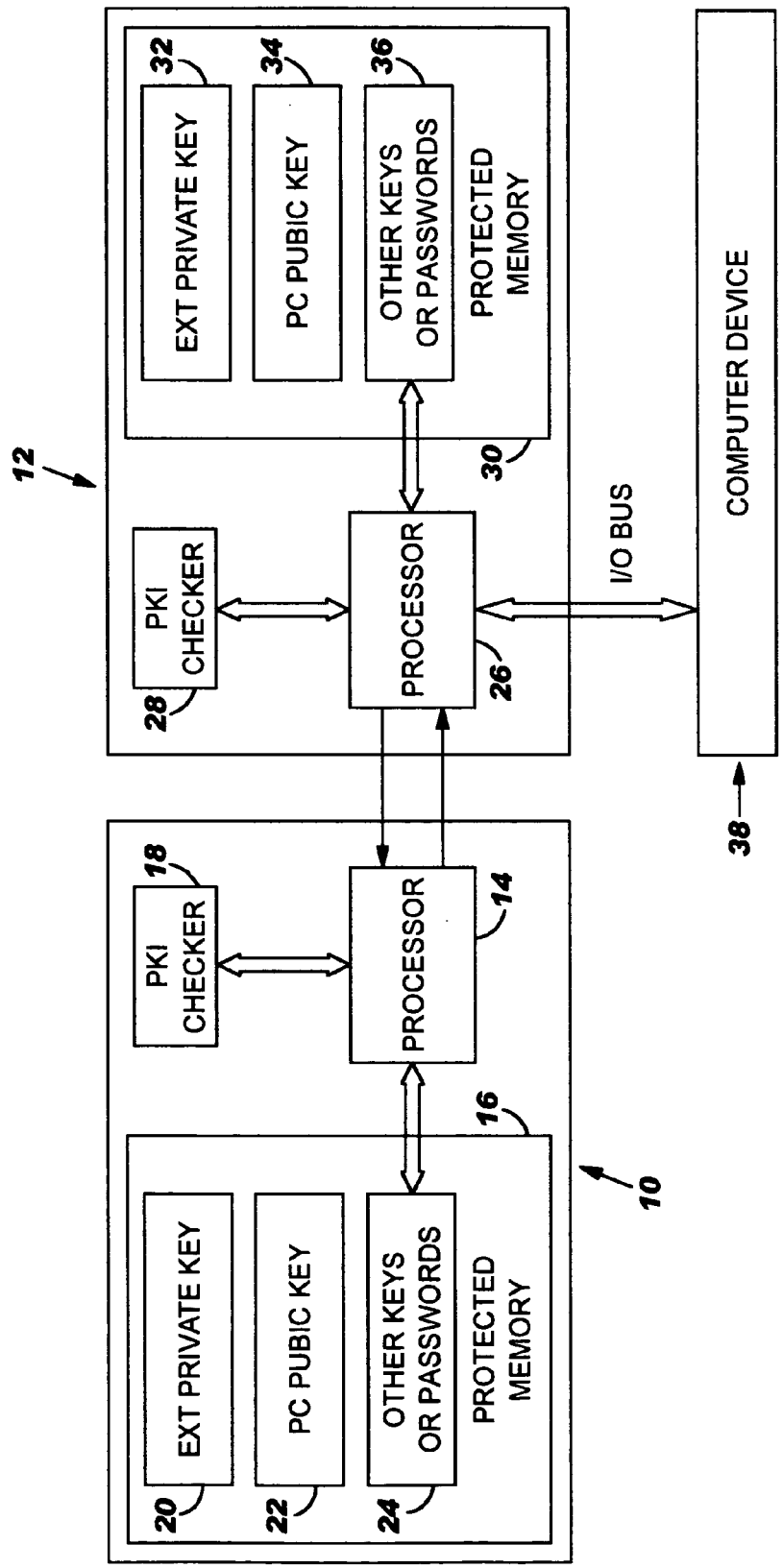
FIG. 1 is a block diagram representing the security system according to the invention, including the extractable security piece, the PC security area, and its link with the computer device.

As shown in FIG. 1, the invention includes the use of an extractable security piece 10 and a PC security area 12 in combination. Without the extractable security piece 10, the computer device 38 and all included or attached devices such as memory, hard disk, and various peripherals cannot be used. The extractable security piece 10 may be a keyboard key or an integrated mouse button, a block containing a small display screen or an LED area, or a PCMCIA card. In the latter case, one of the PCMCIA slots is preempted, and cannot be used for other purposes. The PC security area 12 may be any part of the computer device 38 hardware/firmware including the operating system and the installed applications. This PC security area 12 is generally included in the computer device motherboard, or another mandatory board or card in the computer device 38, and cannot be removed.

The extractable security piece 10 includes a processor 14, which may be a microprocessor having an integrated communication port, a memory 16 protected against external read (which might be a memory integrated within processor 14), and a PKI checker 18, which may be a software application used by the processor 14 to encrypt or authenticate data sent to PC security area 12. Protected memory 16 includes an extractable private key 20, a PC Public Key 22 public key of the computer device 38, and other keys or passwords 24.

Similarly, PC security area 12 includes a processor 26 which communicates with processor 14 via a communication port, a PKI checker 28 which may be a software application used to encrypt or authenticate data sent to extractable security piece 10, and a protected memory 30, which may be integrated within processor 26. The protected memory 30 contains an extractable public key 32 (the public key of the extractable security piece 10), a PC private key 34, and other keys or passwords 36.

When the extractable security piece 10, which had been previously removed from the computer device 38 by the authorized user, is reinserted into its proper location within the computer device 38, a mutual authentication with the PC security area 12 is automatically performed as explained below. When this checking is completed, processor 26 may open access to the computer device 38 by its I/O bus for OS or application password checking, application authentication, or encryption. Furthermore, computer device 38 may open communication to processor 26 for validating external users such as remote users.

Figure 2:
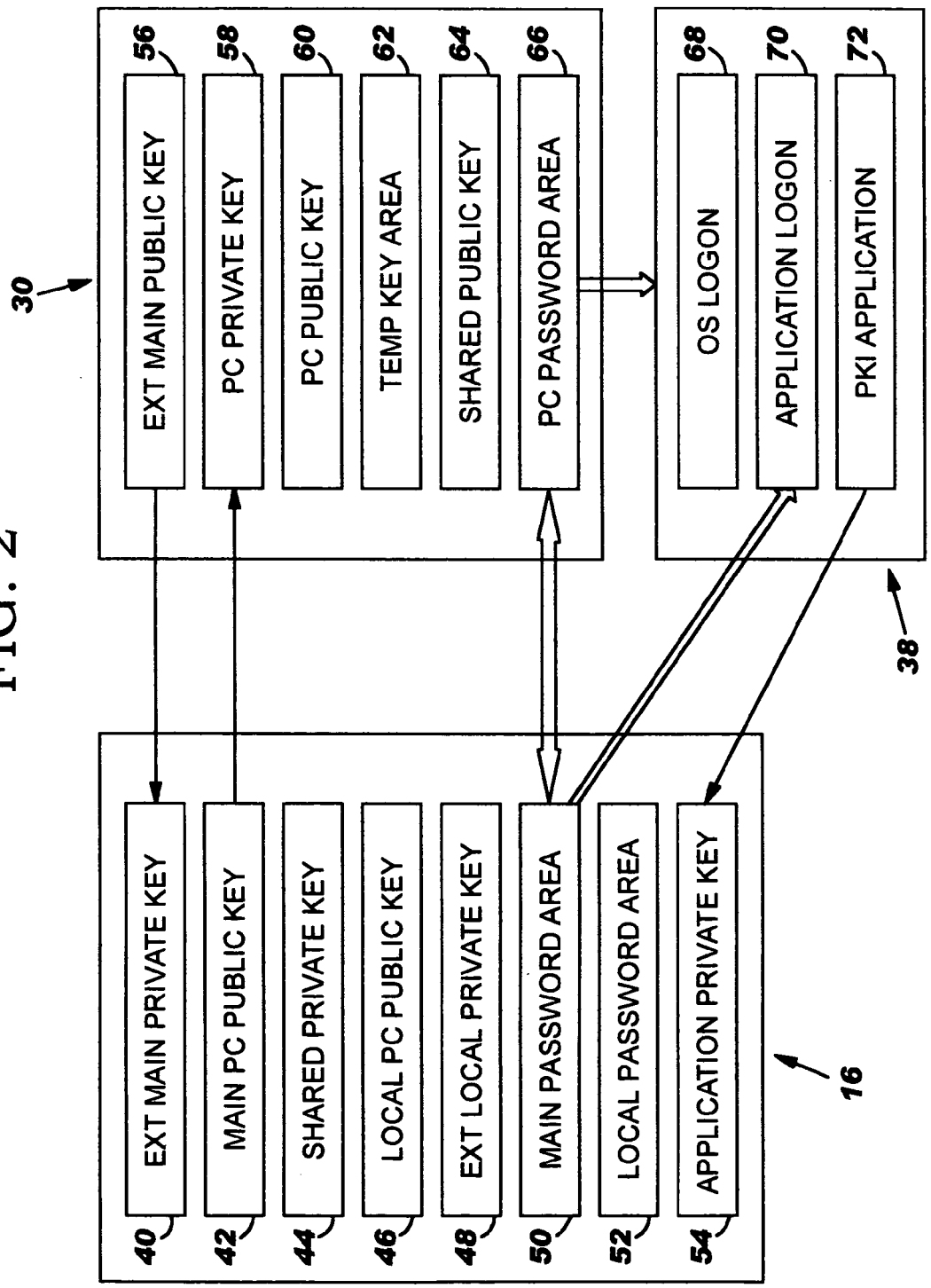
FIG. 2 is a schematic representation of the interactions between the extractable security piece, the PC security area, and the computer device when the extractable security piece is installed on the main computer device.

The protected memory 16 of extractable security piece 10 includes a set of storage areas as shown in FIG. 2. The storage areas may contain keys, full certificates including keys, or password areas. In particular, the storage areas of protected memory 16 may contain the following:

EXTRACTABLE MAIN PRIVATE KEY 40, which is the private key that uniquely identifies the extractable security piece 10. It is similar to a serial number but much more complex, and is not readable. The extractable main private key 40 is used by the extractable security piece 10 to identify itself to the computer device 38 and to allow the computer device 38 to send encrypted messages to the extractable security piece 10 which can be decrypted only with knowledge of the extractable main private key 40.

MAIN PC PUBLIC KEY 42, which is the public key that corresponds to the computer device 38, and which is used to encrypt messages sent to the PC security area 12, such as requests to authorize the use of the security piece 10 in this environment. The main PC public key is also used to authenticate messages coming from the PC security area 12.

SHARED PRIVATE KEY 44, which is a private key that is generated by the user and transmitted to other extractable security pieces that will be recognized by computer device 38 for some applications as explained hereafter.

LOCAL PC PUBLIC KEY 46, which is the PC public key used to identify the extractable security piece 10 to a computer device that is not the computer device 38 to which this extractable security piece belongs.

EXTRACTABLE LOCAL PRIVATE KEY 48, which is a private key that uniquely identifies an extractable security piece put on a computer device which is not the computer device to which this particular extractable security piece belongs. This key together with LOCAL PC PUBLIC KEY 46 form a set of keys corresponding to a possible guest computer device as explained hereafter. These keys may be duplicated to allow multiple computer device attachment.

MAIN PASSWORD AREA 50, which contains the passwords necessary for use in local attachment with the computer device 38 or for remote attachment.

LOCAL PASSWORD AREA 52, which is used in guest mode when the extractable security piece 10 is authorized on another computer device as explained below. The authorized user may want to keep all its passwords on the extractable security piece 10 and not on the computer device 38 itself.

APPLICATION PRIVATE KEY 54, which is a key that can be used for some applications such as building secure IPSec tunnels. It can also be used to implement the PKI procedure for performing encryption and/or authentication. More than one such field may be included in the extractable security piece 10.

The protected memory 30 of the PC security area 12 may include functions similar to the ones which may be included in the protected memory 16 of the extractable security piece 12. In particular, the storage areas of protected memory 30 may contain the following:

EXTRACTABLE MAIN PUBLIC KEY 56, which is the public key of the extractable security piece 10, and which is used by the computer device 38 to send encrypted messages that are decrypted by the extractable security piece 10 using the MAIN PC PUBLIC KEY 42.

PC PUBLIC KEY 60, which is the public key of the computer device 38 and which is used by the computer device 38 to send encrypted messages to other external devices. This key may be identical to the MAIN PC PUBLIC KEY 42 of the extractable security piece 10. It is in fact identical if the extractable security piece 10 is the one which corresponds to the computer device 38 (main computer device with main security piece).

TEMP KEY AREA 62, which may contain a temporary key used to store a private key when another extractable security piece is put on the main computer device 38 as explained below.

SHARED PUBLIC KEY 64, which is a public key that is transmitted to another extractable security piece put on the main computer device 38 as explained below.

PC PASSWORD AREA 66, which contains the PC passwords that may be exchanged with passwords stored in MAIN PASSWORD AREA 50 of the extractable security piece 10 or which may be used to update these passwords.

The computer device 38 includes OS LOGON 68, which is the operating system logon that validates the login password through a compare on the contents of either PC PASSWORD AREA 66 or MAIN PASSWORD AREA 50 when the extractable security piece 10 has been recognized. The computer device 38 also includes APPLICATION LOGON 70, which is used when an application needs a password which is in MAIN PASSWORD AREA 50 within the extractable security piece 10, and PKI APPLICATION 72, which uses APPLICATION PRIVATE KEY 54 also within the extractable security piece 10.

Figure 3:
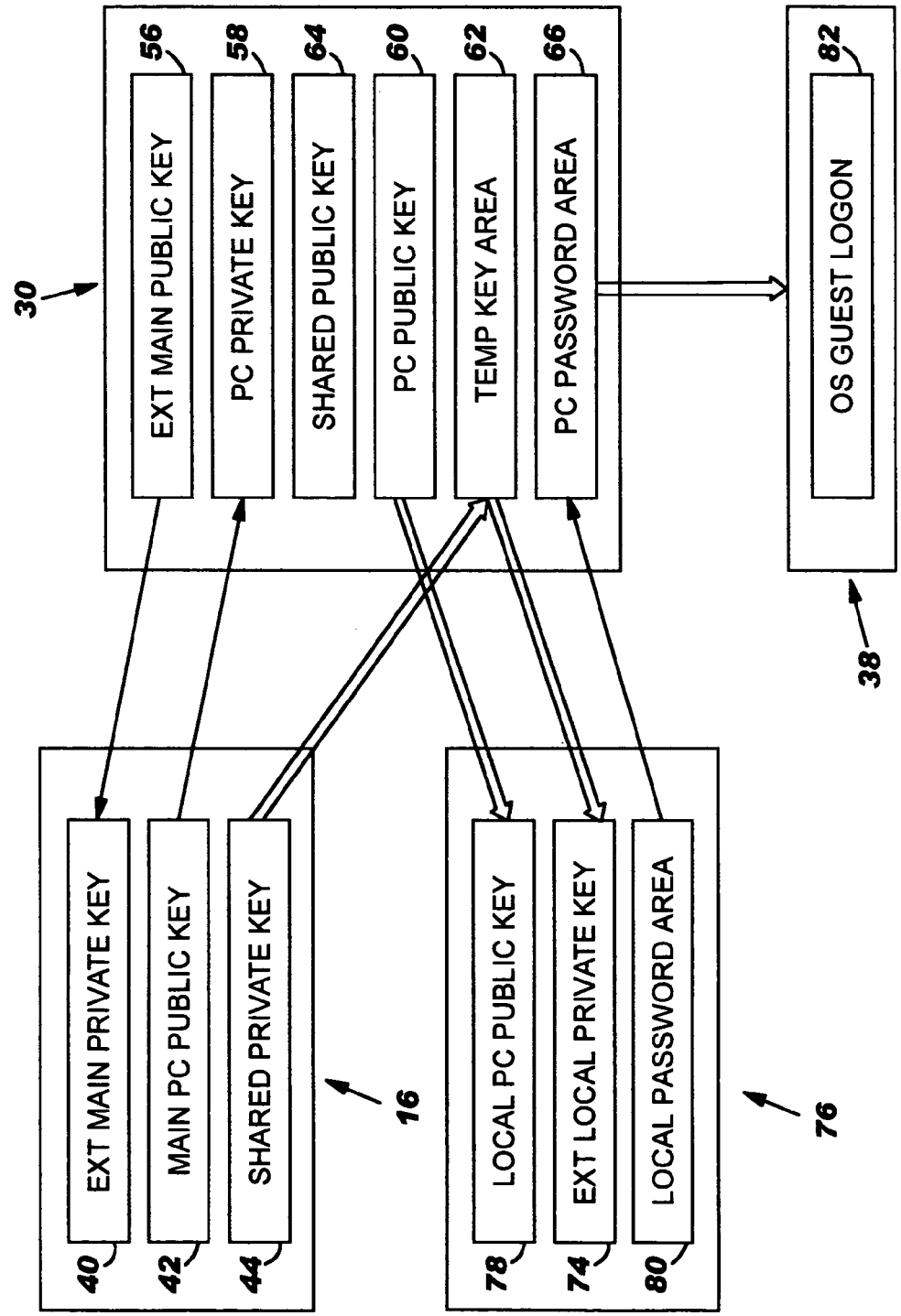
FIG. 3 is a schematic representation of the interactions between the main extractable security piece, the PC security area, a guest extractable security piece, and the computer device when a guest extractable security piece is installed on the main computer device.

FIG. 3 illustrates the case where another extractable security piece is used with the computer device 38 in place of the main extractable security piece. In such a case, the first step is to insert the main extractable security piece into main computer device 38. The extractable security piece 10 is authenticated as already mentioned using the EXT MAIN PRIVATE KEY 40 and EXT MAIN PUBLIC KEY 56 on the one hand, and the MAIN PUBLIC KEY 42 and PC PRIVATE KEY 58 on the other hand.

Then, the SHARED PRIVATE KEY 44 within the protected memory 16 of the main extractable security piece 10 is copied into TEMP KEY AREA 62 of the protected memory 30 of the PC security area 12. The main extractable security piece 10 may then be removed from the computer device 38, and replaced by the guest extractable security piece. Of course, the identity of the guest security piece can be checked by its external serial number and by the server which stores the corresponding public key.

The key within TEMP KEY AREA 62 of protected memory 30 is loaded into an EXT LOCAL PRIVATE KEY 74 within a protected memory 76 of the guest extractable security piece as shown in FIG. 3. Therefore, the EXT LOCAL PRIVATE KEY 74 of the guest extractable security piece matches the SHARED PUBLIC KEY 64 of the computer device 38.

Finally, the computer device 38 stores its PC PUBLIC KEY 60 into the protected memory 76 of the guest extractable security piece as the LOCAL PC PUBLIC KEY 78 in order to complete the bi-directional secure link. Once this link is established, the local password area 80 of the guest extractable security piece can be used via PC PASSWORD AREA 66 of the computer device 38 for OS GUEST LOGON 82 of the computer device 38.

Figure 4:
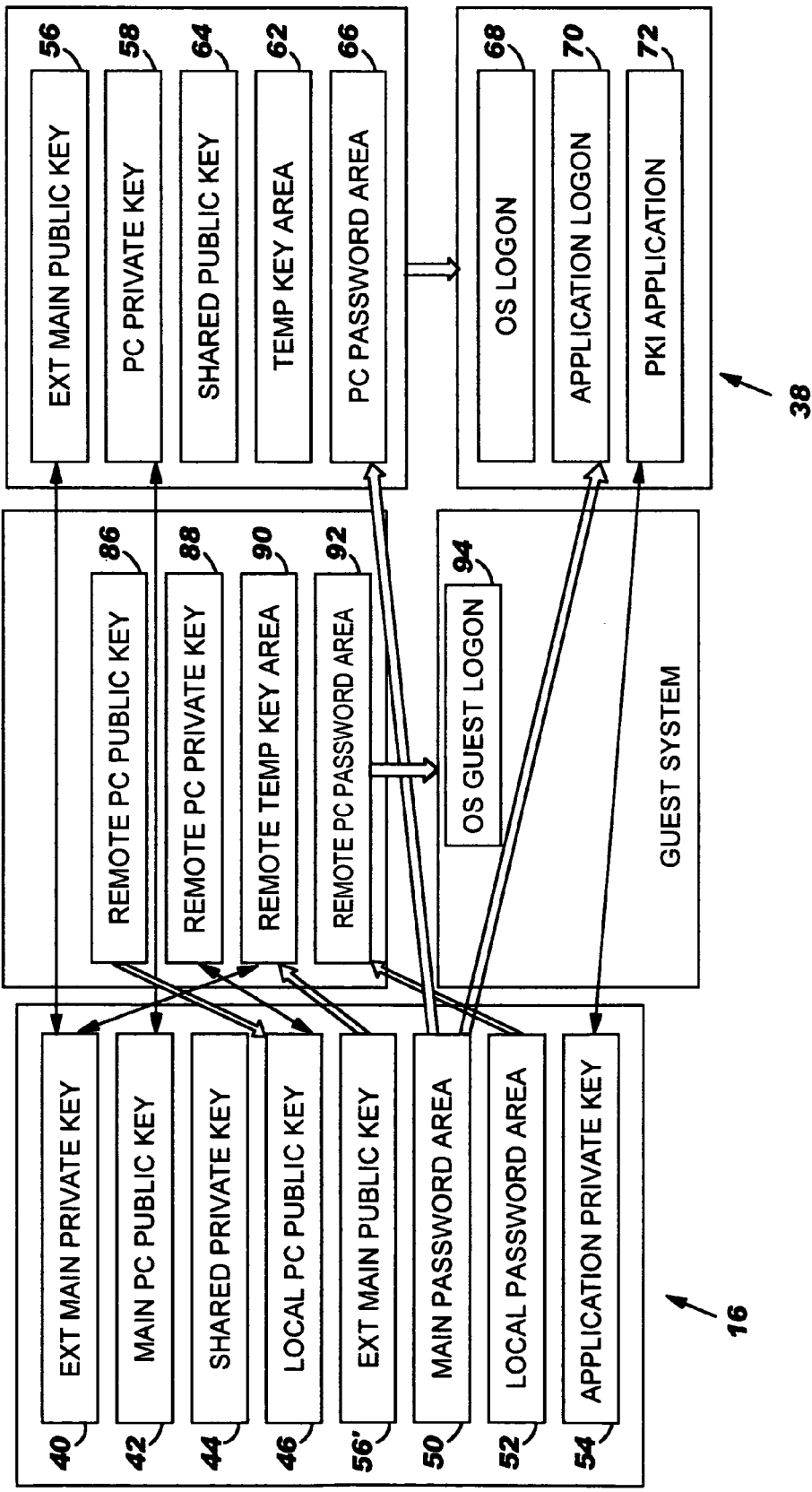
FIG. 4 is a schematic representation of interactions between the extractable security piece, the main PC security area, a guest PC security area, and the main and guest computer devices when the main extractable security piece is installed on a remote computer device.

Another application of the invention is when the main extractable security piece 10 is inserted into a remote computer device or a guest computer device. The process to be implemented for such a case is illustrated in FIG. 4, wherein the bi-directional arrows represent the relationships between entities, and the bus represents data transfer. Note that the references used in FIG. 2 have been kept when such references designate the same entities such as the different areas of the main extractable security piece 10 or the PC security area 12 of the main computer device 38.

The extractable security piece 10 connects with the guest computer device security area using the EXT MAIN PRIVATE KEY 40 to transmit the corresponding public key to the REMOTE TEMP KEY AREA 90 that will now contain the EXT MAIN PUBLIC KEY.

Private and public keys are generated simultaneously. The public key may be provided to external devices without risk. Even if the remote computer device is not well known, there is little risk in giving it the Public key. In addition, each user may define rules to change both private and public keys regularly, and may update other equipment also to replace an old public key with a new one.

The update and key transmissions between different entities may be done using certificates, which contain the device ID and the public key. These certificates are certified by Certificate Authority (CA) servers, which are trusted entities. Such CA servers can therefore be used as authentication servers. They know, for example, all public keys of all devices of a customer, and can therefore allow them to communicate securely. A rule may be to trust only certificates issued by this CA. Using this method, the remote computer may verify ownership of the public key.

The extractable security piece needs to receive the PC public key to securely communicate with the remote computer device. The remote computer device transfers its REMOTE PC PUBLIC KEY 86 (matching the REMOTE PC PRIVATE KEY 88) into field LOCAL PC PUBLIC KEY 46 located in the protected memory 16 of the extractable security piece 10. At this step, secure communications can be established between the remote computer device and the extractable security piece 10. The user may then logon as a guest into the remote computer device, using a profile that allows remote connection.

One type of connection may be to connect to the CA to verify the identity of the remote computer device before doing more in this environment. In that case, the REMOTE PC PUBLIC KEY 86 is verified.

An object of such interconnection is to provide the user with access to the main computer device 38 in a secure way. The connection to the main PC security area 12 is established using the main set of keys as described in FIG. 1: EXT MAIN PRIVATE KEY 40 and MAIN PUBLIC KEY 42 on the security piece side, and EXT MAIN PUBLIC KEY 56 and PC PRIVATE KEY 58 on the main computer device side. There is no possibility for the remote computer device to decrypt data communication between the main extractable security piece 10 and its main computer device 38 even if it knows the public key of each.

Finally, through this secure channel, all passwords stored in MAIN PASSWORD AREA 50 can be used and securely transferred to PC PASSWORD AREA 66 on the main PC security area 12 and used as APPLICATION LOGON 70 for a normal logon. The remote computer device is then viewed as local equipment. At this step, the shared secret keys may be exchanged to build a secure communication channel between the main computer device 38 and the remote computer device that will then use less computing resources than a PKI communication.

Additionally, applications may work as already described with reference to FIG. 1, that is PKI APPLICATION 72 may use the key stored in APPLICATION PRIVATE KEY 54 with the help of PKI checkers that are not represented in FIG. 4 but which are present on each extractable security piece and each PC security area.

We claim:

1. A Security system for preventing unauthorized use of a main computer device having an authorized user, comprising:
    an extractable security piece which can be removed from the main computer device by the authorized user, wherein the extractable security piece includes an extractable main private key and a main PC public key;
    a PC security area, which is a non-extractable part of said main computer device, wherein said PC security area includes a PC private key and an extractable main public key that constitute a Public Key Infrastructure (PKI) with, respectively, the extractable main private key and the main PC public key; and
    processing means in said extractable security piece and in said PC security area for mutual authentication of said extractable security piece and said PC security area, wherein said extractable main private key identifies said extractable security piece to said PC security area and said PC private key authenticates said PC security area to said extractable security piece after said extractable security piece, which had been previously removed from said PC security area, is reinserted in said PC security area to enable the authorized user to access data stored in said main computer device, wherein said extractable security piece and said PC security area each comprise a PKI checker for encrypting and authenticating data exchanged between said PC security area and said extractable security piece when said extractable security piece is reinserted in said main computer device, said extractable security piece PKI checker encrypting extractable security piece data with said main PC public key and said PC security area PKI decrypting the encrypted extractable security piece data with said PC private key, and said PC security area PKI checker encrypting PC security area data with said extractable main public key and said extractable security piece PKI checker decrypting the PC security area data with said extractable main private key.

2. The security system according to claim 1, wherein said extractable security piece includes a password that is used by said computer device and that is exchanged with a password included in said PC security area.

3. The security system according to claim 1, wherein said extractable security piece is a keyboard key of said main computer device.

4. The security system according to claim 1, wherein said extractable security piece is an integrated mouse button.

5. The security system according to claim 1, wherein said extractable security piece includes a PCMCIA card.

6. A method for authorizing a main computer device having an authorized user to be used by a guest user, wherein said main computer device includes a main extractable security piece that includes an extractable main private key, a main PC public key, and a first processor, and a PC security area that includes an extractable main public key and a PC private key that constitute a Public Key Infrastructure (PKI) with said keys of a said extractable security piece and a second processor for exchanging authentication data with said first processor, said method comprising the steps of:

inserting said main extractable security piece into a location of said main computer device, wherein said main extractable security piece includes a shared private key which is transferred into a temporary key area of said PC security area when said main extractable security piece is inserted into said main computer device;

removing said main extractable security piece from said main computer device after said first and second processors have exchanged said authentication data comprising the extractable main private key and the main PC public key; and inserting into the location a guest extractable security piece of a guest computer of said guest user, wherein said guest extractable security piece includes the same functions and areas as said main extractable security piece, said shared private key is transferred from said PC security area of said main computer device into said guest extractable security piece and the PC public key is transferred from said PC security area as a local PC public key into said guest extractable security piece when said main extractable security piece has been replaced by said guest extractable security piece in said computer device, said extractable main private key identifies said guest extractable security piece to said PC security area, and said PC private key authenticates said PC security area to said guest extractable security piece, wherein said guest extractable security piece and said PC security area each comprise a PKI checker for encrypting and authenticating data exchanged between said PC security area and said guest extractable security piece when said guest extractable security piece is reinserted in said main computer device, said guest extractable security piece PKI checker encrypting guest extractable security piece data with said main PC public key and said PC security area PKI decrypting the encrypted guest extractable security piece data with said PC private key, and said PC security area PKI checker encrypting PC security area data with said extractable main public key and said guest extractable security piece PKI checker decrypting the PC security area data with said extractable main private key.

7. A security method for authorizing a main computer device having an authorized user to be used remotely from a remote computer device by said authorized user wherein said main computer device includes a main extractable security piece that includes an extractable main private key and a main PC Public key and a first processor, and a PC security area that includes an extractable main public key and a PC Private key that constitute a Public Key Infrastructure (PKI) with said keys of said extractable security piece and a second processor for exchanging authentication data with said first processor, said method comprising the step of inserting said main extractable security piece into said remote computer device so that an extractable main public key is transferred from said main extractable security piece into a temporary key area within a remote PC security area of said remote computer device in order for said remote computer device to verify that said extractable main public key corresponds to said authorized user, wherein said extractable main private key identifies said main extractable security piece to said remote PC security area, said PC private key authenticates said remote PC security area to said main extractable security pieces, a PC public key included in said remote PC security area of said remote computer device is transferred as a local PC public key into said main extractable security piece of said main computer device so that security communications may be established between said main extractable security piece and said remote PC security area, wherein said main extractable security piece and said remote PC security area each comprise a PKI checker for encrypting and authenticating data exchanged between said remote PC security area and said main extractable security piece when said main extractable security piece is reinserted in said remote computer device, said main extractable security piece PKI checker encrypting main extractable security piece data with said main PC public key and said remote PC security area PKI decrypting the main encrypted extractable security piece data with said PC private key, and said remote PC security area PKI checker encrypting remote PC security area data with said extractable main public key and said main extractable security piece PKI checker decrypting the remote PC security area data with said extractable main private key.

* * * * *